US012259306B2

(12) United States Patent
Reszewicz et al.

(10) Patent No.: US 12,259,306 B2
(45) Date of Patent: Mar. 25, 2025

(54) SENSOR HEAD ASSEMBLY FOR A MEASUREMENT SYSTEM

(71) Applicant: Kidde Technologies, Inc., Wilson, NC (US)

(72) Inventors: Modest Adam Reszewicz, Dolnoslaskie (PL); Adrian Tarnowski, Dolnośląskie (PL); Mark P. Fazzio, Wilson, NC (US); Emil F. Baran, Jr., Sims, NC (US); James Varnell, Black Creek, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 477 days.

(21) Appl. No.: 17/315,824

(22) Filed: May 10, 2021

(65) Prior Publication Data
US 2021/0349000 A1    Nov. 11, 2021

(30) Foreign Application Priority Data

May 8, 2020 (PL) .......................................... 433841

(51) Int. Cl.
*G01N 15/06* (2024.01)
*G01N 15/075* (2024.01)

(52) U.S. Cl.
CPC ........... *G01N 15/06* (2013.01); *G01N 15/075* (2024.01)

(58) Field of Classification Search
None
See application file for complete search history.

(56) References Cited

U.S. PATENT DOCUMENTS

| 2,559,634 | A | | 7/1951 | Keefe, Jr. et al. |
| 4,653,063 | A | * | 3/1987 | Acharekar ............. H01S 3/025 372/98 |
| 4,749,276 | A | * | 6/1988 | Bragg .................. G01N 21/031 250/343 |
| 4,821,586 | A | * | 4/1989 | Scordato ............... B01L 3/0227 73/864.18 |
| 5,303,036 | A | * | 4/1994 | McLachlan ........ G01N 21/8507 359/838 |
| 6,756,561 | B2 | | 6/2004 | McGregor et al. |
| 8,161,790 | B2 | | 4/2012 | Ayers |

(Continued)

FOREIGN PATENT DOCUMENTS

| EP | 0540870 A2 | 5/1993 |
| EP | 0540870 A3 | 3/1994 |
| WO | WO-2016167383 A1 * | 10/2016 |

OTHER PUBLICATIONS

European Search Report for Application No. 21171026.4 mailed Oct. 4, 2021, 7 pages.

*Primary Examiner* — Michelle M Iacoletti
(74) *Attorney, Agent, or Firm* — CANTOR COLBURN LLP

(57) ABSTRACT

A sensor head assembly for a measurement system for powderised agent includes: an elongate body having a proximal end configured to receive a fibre optic cable, and a distal end; a sensing chamber provided within the elongate body, a first window provided at a proximal side of the sensing chamber and a second window provided at a distal end of the sensing chamber; and a concave mirror mounted within the elongate body at a distal side of the second window, wherein the concave mirror is mounted such that its position within the elongate body is adjustable.

13 Claims, 6 Drawing Sheets

(56) References Cited

U.S. PATENT DOCUMENTS

| | | | |
|---|---|---|---|
| 2003/0137708 A1* | 7/2003 | Takase | G02B 7/182 |
| | | | 359/216.1 |
| 2004/0011974 A1* | 1/2004 | Matsuda | G01N 21/53 |
| | | | 250/574 |
| 2009/0180114 A1* | 7/2009 | Fujii | G01N 21/718 |
| | | | 356/318 |
| 2010/0259757 A1* | 10/2010 | Ayers | G01N 21/53 |
| | | | 73/1.02 |
| 2017/0144248 A1 | 5/2017 | Yoshimura et al. | |
| 2021/0255086 A1* | 8/2021 | Nakai | G01N 15/1459 |

* cited by examiner

SENSOR HEAD ASSEMBLY FOR A MEASUREMENT SYSTEM

This application claims priority to Polish Patent Application No. P.433841 filed May 8, 2020, the entire contents of which is incorporated herein by reference.

TECHNICAL FIELD

This disclosure relates to measurement systems for powderised agent, and more particularly to sensor heads for measurement systems for powderised agent.

BACKGROUND

Measurement systems are known for determining a quantity of a powderised agent within test volume. One known device, sometimes referred to as a powderiser, in which the solid particle concentration measurement is based on light obscuration. Such measurement systems can be used in wide variety of applications for measuring powderised agent or particulates.

A light source, for example and an LED light source, is transmitted via optic fibres provided within a fibre optic cable to a sensor head. Within the sensor head, the light exits the end of the cable, through a sensing volume, reflects off of a concave mirror and returns to the fibre optic cable end. The return light is then transmitted return fibres within the fibre optic cable to a photodiode, in which the signal is converted to a voltage output. When particles are present in the sensing volume they obscure the light reflected from the concave mirror which is returning to the fibre optic cable. This results in voltage reduction within the photodiode, which can be converted into a particle concentration. During its working life, this type of device must be repeatedly handled during its operation, for example during installation, reposition and for routine cleaning.

Sensitive regions of the sensor head, such as around the end of the fibre optic cable and "clean surface" of mirror(s) and windows/lenses within the sensor head should remain free of containments. If contaminant particles ingress into these sensitive areas, the accuracy of the sensor head can be adversely affected and components may become damaged.

Further problematic issues with known sensor heads include misalignment of critical components, such as windows/lenses and or mirror(s), which can also lead to inaccurate measurements or non-function of the sensor. Routine tasks such as maintenance, repair or cleaning of components within the sensor head can lead to misalignment of components and/or contamination of the sensitive areas of the sensor head.

Therefore, there is a need to provide an improved sensor head which can overcome some or all of the issues outlined above.

SUMMARY

According to a first aspect of this disclosure there is provided a sensor head assembly for a measurement system for powderised agent comprising: an elongate body having a proximal end configured to receive a fibre optic cable, and a distal end; a sensing chamber provided within the elongate body, a first window provided at a proximal side of the sensing chamber and a second window provided at a distal end of the sensing chamber; and a concave mirror mounted within the elongate body at a distal side of the second window, wherein the concave mirror is mounted such that its position within the elongate body is adjustable.

The elongate body may have a substantially cylindrical form. The sensing chamber, first window, second window and concave mirror may be located along a central axis of the sensor head assembly. The concave mirror may be mounted such that its axial position within the elongate body is adjustable.

The sensor head assembly may comprise a first engagement member moveably coupled to a corresponding engagement member provided within the elongate body.

The engagement member may be configured such that movement of the engagement member with respect to the corresponding engagement member causes the concave mirror to move within the elongate body.

The first engagement may be a threaded component. The corresponding engagement member may be a corresponding screw thread. The threaded component may comprise a screw thread. The threaded component may be a screw. The threaded component may be a set screw.

The concave mirror may be coupled to the threaded component.

The concave mirror may be directly coupled to the threaded member. The concave mirror may be removeably coupled to the threaded member. The concave mirror may be directly coupled to the threaded member, such that movement of the threaded member causes movement of the concave mirror within the elongate body The sensor head assembly may comprise a cap at the distal end. The corresponding engagement member may be provided in a through hole provided in the cap.

The corresponding engagement member may be a corresponding screw thread provided in the cap.

The concave mirror may be at least partially radially supported by a proximal end of a cap provided within the distal end of the elongate body.

The sensor head assembly may comprising a cap, which supports a portion of the concave mirror. The concave mirror may be at least partially supported by a cavity provided in the cap.

The sensor head assembly may comprise a biasing member configured to bias the concave mirror way from the sensing volume. The sensor head assembly may comprise a biasing member configured to bias the concave mirror way towards the distal end.

The biasing member may be provided at a distal side of the concave mirror.

The biasing member may be provided between the sensing volume and the second window, such that it biases the second window and the concave mirror away from the sensing volume.

The biasing member may be provided between the second window and the concave mirror.

The biasing member may comprise a spring. The biasing member may comprise a wave spring. The biasing member may comprise at least one wave washer.

The first window may be a clear window. The first window may be configured such that light passes directly through it with a constant light path. The second window may be a clear window. The second window may be configured such that light passes directly through it with a constant light path.

The first window may be a lens. The first window may be configured to modify the path of light passing through it. The first window may be a converging lens. The first window may be configured so as to converge light passing through it. The first window may be a diverging lens. The first window may be configured so as to diverge light passing through it. The second window may be a lens. The second window may be configured to modify the path of light passing through it. The second window may be configured so as to converge light passing through it. The second window may be a converging lens. The second window may be configured so as to diverge light passing through it. The second window may be a diverging lens.

The sensor head assembly may include a further window provided at a proximal side of the first window. The sensor head assembly may include a further window provided at a distal side of the second window.

The sensor head assembly may comprise a cable holder provided at its proximal end, configured to receive and hold an end of the fibre optic cable. The sensor head assembly may comprise a grip provided at its proximal end, the grip being configured to receive and support an end portion of the fibre optic cable.

The sensor head assembly may comprise a second biasing member provided between the grip and the cable holder. The second biasing member may be a spring. The second biasing member may comprise a wave spring. The second biasing member may comprise at least one wave washer.

The sensor head assembly may comprise a mirror housing provided within the elongate body. The concave mirror may be coupled to the mirror housing, such that the concave mirror moves with the mirror housing.

The mirror housing may be moveable within a cavity in the elongate body. The mirror The first window and/or the second window are provided with a radial sealing member.

The radial sealing member may be provided around a circumferential edge of the or each window. The radial sealing member may be provided between a circumferential edge of the or each window and an inner wall of the elongate body.

The first window may be provided with a radial sealing member. The second window may be provided with a radial sealing member. The or each radial sealing member may be an O-ring.

The sensor head assembly may comprise a cap moveably mounted within the distal end of the elongate body, wherein the concave mirror is coupled to the cap.

The concave mirror may be directly coupled to the cap, such that the concave mirror moves with the cap. The concave mirror may be fixed within a cavity provided in the cap.

An outer surface of the cap may comprise an engagement member moveably coupled to a corresponding engagement member provided on an inner surface of the elongate body The sensor head assembly as described above provides robust and reliable solution for configuring and adjusting to optimise the operating parameters of the sensor head, thereby improving accuracy of readings.

According to a further aspect, there is provided a method of using a screw head assembly as described above, the method comprising mounting the sensor head assembly to a fibre optic cable by inserting an end of the cable into the cable holder; adjusting the position of the concave mirror within the elongate body.

Adjustment of the position of the concave mirror may comprise adjusting the focal point.

The step of adjusting the position of the concave mirror may include adjusting a threaded member. The step of adjusting the position of the concave mirror may include moving a mirror housing in which the concave mirror is held.

The step of adjusting the position of the concave mirror may include moving the mirror to an optimum distance from the end of the fibre optic cable.

The method may further comprise analysing data reading from a control box, and using this data to adjust the position of the mirror. The step of analysing data may comprise analysing voltage data.

According to a further aspect, there is provided a measurement system for powderised agent comprising a control box; a fibre optic cable coupled at a first end to the control box and a sensor head as described above, mounted to a second end of the fibre optic cable.

The control box may comprise at least one light source. The control box may comprise one or more photo diodes.

DETAILED DESCRIPTION

Certain preferred examples of this disclosure will now be described, by way of example only, with reference to the accompanying drawings, in which.

Figure 1:
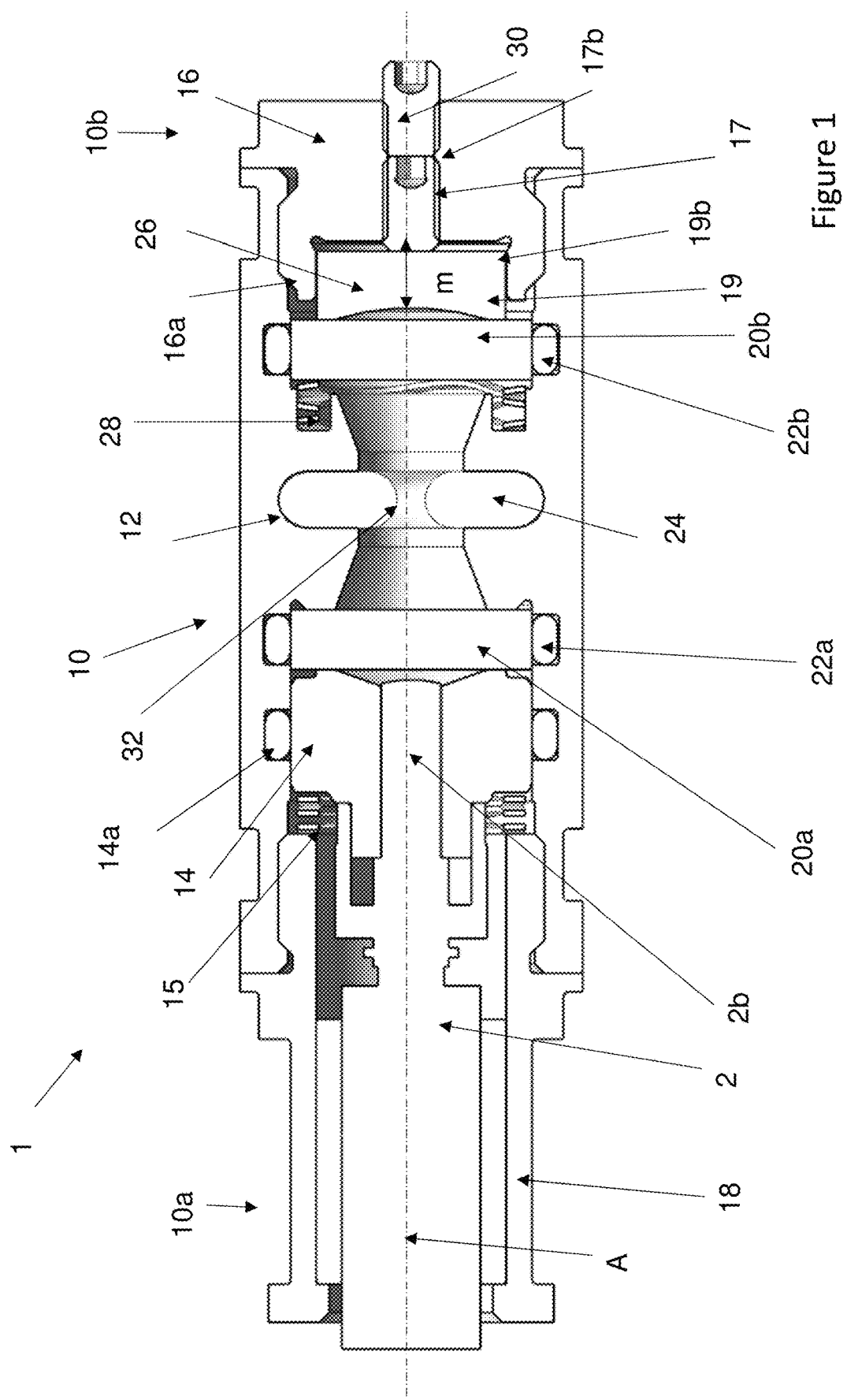
FIG. 1 is a schematic cross-sectional view of a sensor head assembly according to an example of the present disclosure.

FIG. 1 shows a sensor head assembly 1 according to a first example of the present disclosure. The sensor head assembly 1 is suitable for use with a measurement system for powderised agent, The sensor head assembly 1 includes an elongate sensor body 10 having a proximal end 10a and a distal end 10b. Throughout the description, the words proximal and distal are made with reference to the proximal end 10a and the distal end 10b of the elongate sensor body 10.

The sensor body 10 is substantially cylindrical having a central axis A. The sensor body 10 comprises a main housing 12, a cable holder 14, a cap 16 provided at the distal end 10b, and a grip 18 provided at the proximal end 10a. In the example of FIG. 1, the cap 16, the cable holder 14 and the grip 18 are removably mounted within the main housing 12.

It will be appreciated that whilst in the example shown, the sensor body 10 comprises multiple, discrete components, in alternative embodiments (not shown), some or all of the components forming the sensor body 10 may be formed integrally. In other embodiments (not shown), the grip 18 may not be provided.

A fibre optic cable 2 can be attached to the sensor body 10 at its distal end 10a. The components provided within the proximal end 10a of the sensor head assembly 1 are configured to securely retain an end 2b of the fibre optic cable 2.

FIG. 1 shows the sensor head assembly 1 attached to the fibre optic cable 2. An end 2b of the fibre optic cable 2 is inserted through the grip 18 and a through-hole 14f formed in the cable holder 14. An end 2b (which may also be referred to as the sensor end) of the fibre optic cable 2 is located beyond the through hole 14*f*.

The cable holder 14 and grip 18 are configured to be retained within the sensor body 10. When fitted, the fibre optic cable 2 extends through and is supported by the grip 18. The fibre optic cable 2 extends through the through-hole 14*f*, and is therefore retained in the sensor body 10 by the cable holder 14.

A sealing member 14*a* is provided around an outer surface of the cable holder 14. A resilient member 15, which in this case is shown in the form of a spring, acts between a distal (forward facing) surface of the grip 18 and a proximal (rear facing) surface of the cable holder 14, in other words the resilient member 15 is provided between opposing surfaces of the cable holder 14 and the grip 18.

Provided within the main housing 12 is a sensing volume 24. A first window 20*a* is located at a proximal end of the sensing volume 24 and a second window 20*b* is located at a distal end of the sensing volume 24.

The windows 20*a*, 20*b* in the example of FIG. 1 are clear windows, in other words they do not deflect light passing through.

In FIG. 1, the first and second windows 20*a*, 20*b* are thick enough in the axial direction to support a respective sealing member 22*a*, 22*b* provided around the circumference of each window 20*a*, 20*b*. In other words, each window 20*a*, 20*b* has a thickness approximately equal to the thickness of the respective sealing member 22*a*, 22*b*. The sealing members 22*a*, 22*b* provide radial sealing of the sensing volume 24, thereby preventing leakage into other sensitive parts of the sensor head assembly 1. In this example, the sealing members 22*a*, 22*b* are shown in the form of O-rings. It will be appreciated that other suitable sealing members 22*a*, 22*b* may be used.

A concave mirror 26 is mounted within the main housing 12 and is radially retained in correct alignment by one or more elements 16*a* formed within the cap 16. In FIG. 1, the cap 16 includes a cavity 19 at its proximal end, and a distal end of the concave mirror 26 sits within the cavity 19 such that a cavity wall 19*b* acts as the securing element 16*a*. The cap 16 includes a through-hole 17 having a threaded wall 17*b* extending from the cavity 19. A threaded member 30, for example as shown in this embodiment, a pair of set screws 30, extends through the hole 17, and the screw threads of the set screws 30 engage with the threaded wall 17*b*. The end of the proximal set screw 30 contacts with a distal surface of the mirror 26.

A proximal surface of the concave mirror 26 contacts a distal surface of the second window 20*b*. A second (distal) resilient member 28 is provided at a distal side of the second window 20*b*, thereby biasing the second window 20*b* and concave mirror 26 against the end of the set screw 30. The set screws 30 are adjusted within the threaded hole 17 to adjust the axial position of the concave mirror 26 and the second window 20*b* relative to the end 2*b* of fibre optic cable 2. Movement of the concave mirror 26 resulting from adjustment of the set-screws 30 is represented by the arrow labelled m. Adjustment of the position of the concave mirror 26 towards or away from the sensing volume 24, thereby allowing optimisation of the distance between the concave mirror 26 and the end 2*b* of the fibre optic cable 2. This movement also results in a corresponding adjustment and optimisation of the focal point.

Figure 2:
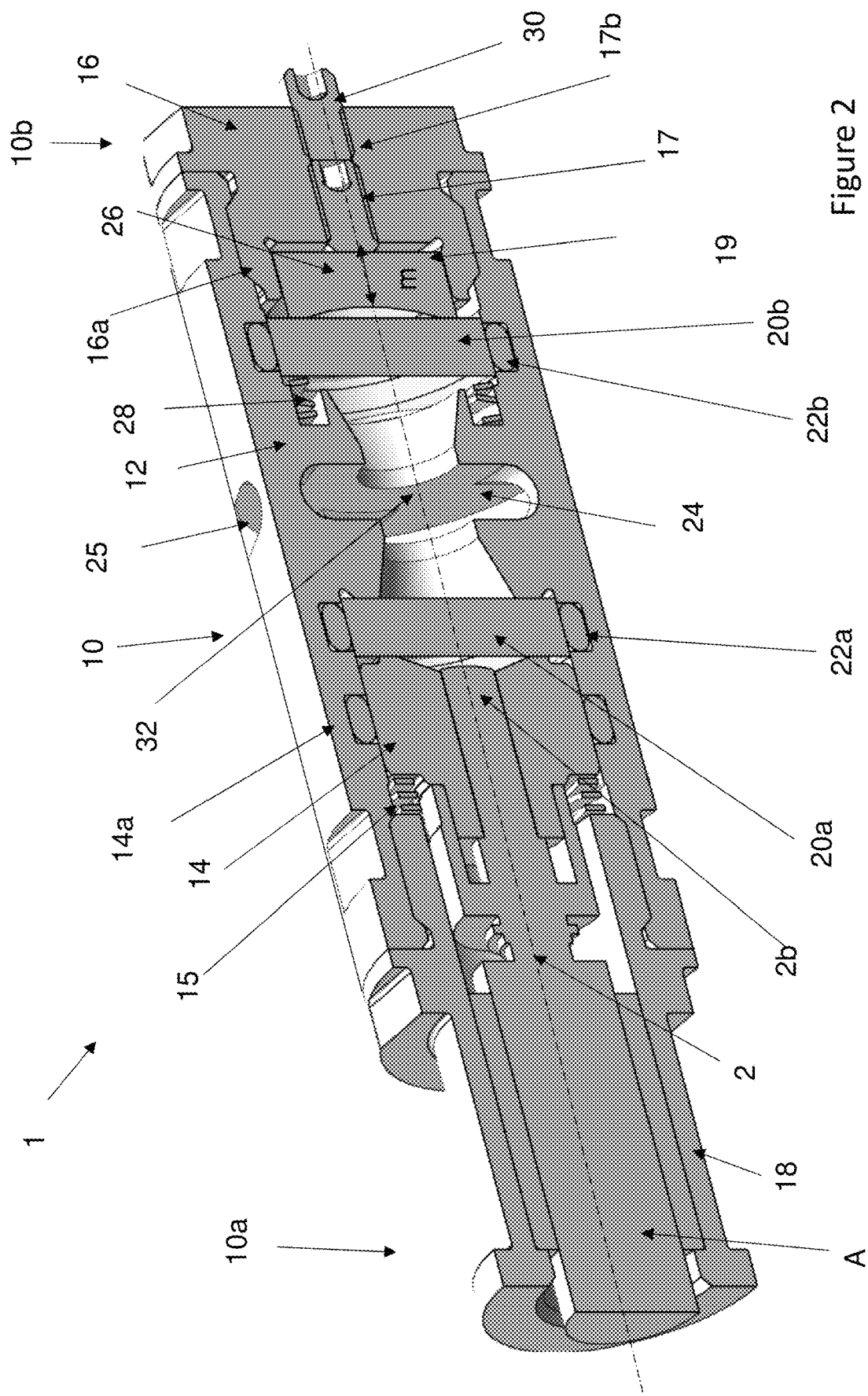
FIG. 2 shows a perspective cross-sectional view of the sensor head assembly of FIG. 1.

FIG. 2 shows a perspective cross-sectional view of the sensor head assembly 1 of FIG. 1. From this view, an entrance 25 providing access to the sensing volume 24, provided in the main housing 12, can be seen.

In another example (not show), the example of FIGS. 1 and 2 can be modified so that the second resilient member 28 is provided between the second window 20*b* and the concave mirror 26. In this case, the second resilient member 28 biases the second window 20*b* towards the sensing volume 24, and it biases the concave mirror 26 towards the end of the set screws 30. This means that when the set screw 30 is adjusted the axial position of the concave mirror 26 is adjusted, and the second window 20*b* remains stationary.

Figure 3:
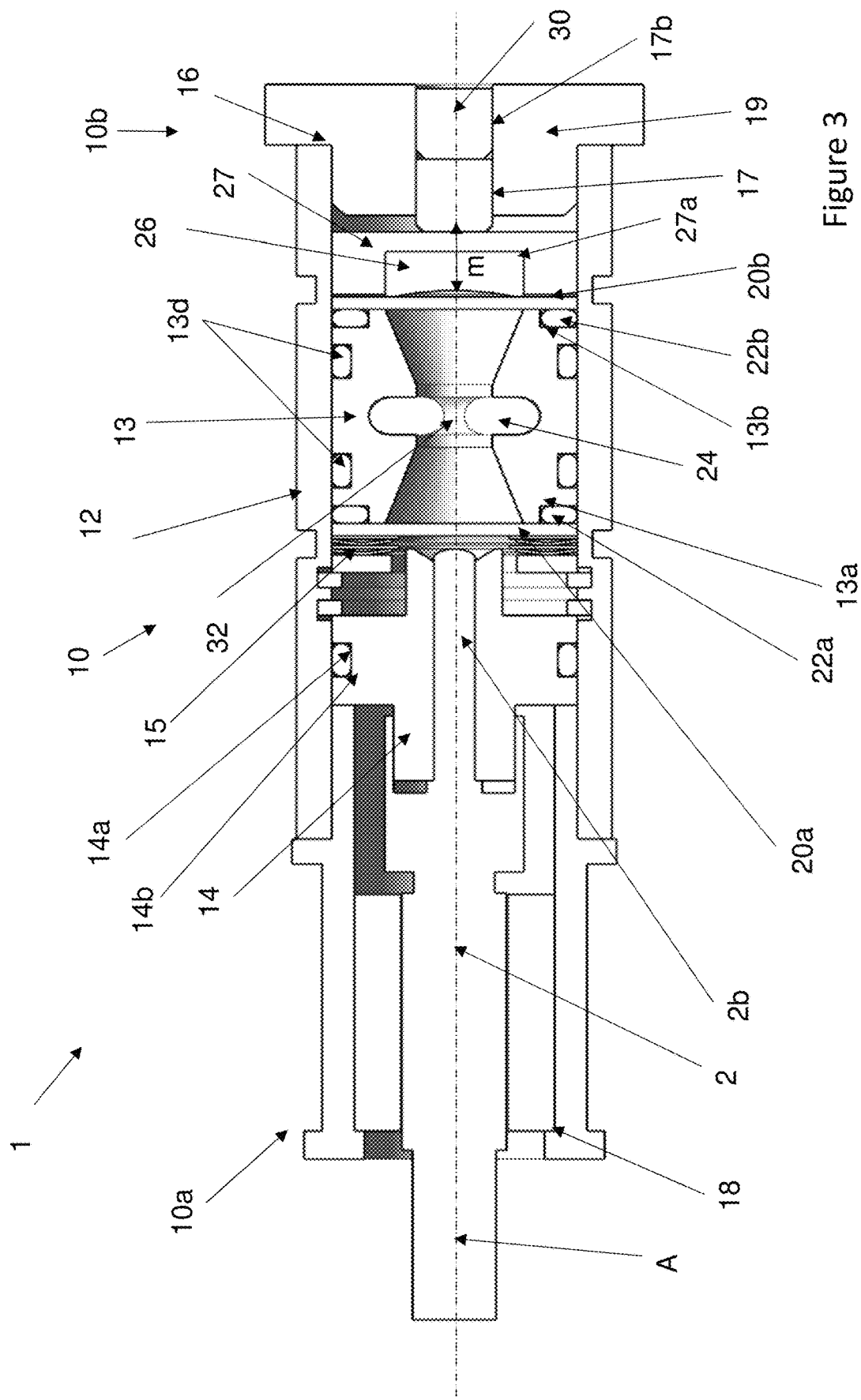
FIG. 3 shows a schematic cross-sectional view of a sensor head assembly according to another example of the present disclosure.

FIG. 3 shows another embodiment of a sensor head assembly 1 in which the same or corresponding components are provided with references signs as used above. The main differences between FIG. 3 and FIG. 1 are outlined below.

The embodiment of FIG. 3 includes a cable holder 14 with a modified profile in the axial direction. The cable holder 14 of this example includes a circumferential cavity 14*b* in which the sealing member 14*a* is located. It will be appreciated that in a further example, the cable grip 14 profile described for FIG. 1 could be used in the example of FIG. 3. One or more resilient members 15 are provided between the first window 20*a* and the cable holder 14. The one or more resilient members 15 provide clearance compensation. The one or more resilient members 15 could be a wave spring or one or more wave washers. The one or more resilient members 15 also bias the components within the housing 12 towards the distal end 10*b*. This ensures that there is always force acting to hold the concave mirror 26 against the mirror holder 27, and in turn the mirror holder 27 is held against the set screws 30, thereby allowing regulation of the position of the mirror 27 without needing to fix the mirror holder 27 to the set screws 30.

The sensing volume 24 is formed within an inner body 13 which is provided as a discrete component within the main housing 12. Sealing members 22*a*, 22*b* are provided between respective windows 20*a*, 20*b* and a respective window facing shoulder 13*a*, 13*b* formed on the inner body 13. One or more additional sealing elements 13*d* may be provided. Sealing elements 22*a*, 22*b* and 13*d* prevent leakage from the sensing volume 24.

A mirror housing 27 is moveable within a cavity in the main housing 12. The concave mirror 26 is located and held within the mirror housing 27. The concave mirror 26 is secured in a cavity 27*a* of the mirror housing 27. A distal surface of the mirror housing 27 contacts with the end of the threaded member 30, which is provided in the threaded through hole 17 of the cap 16. The threaded member 30 can be axially moved with respect to the cap 16, and since the mirror housing 27 moves with the threaded member 30, the axial position of the concave mirror 26 with respect to the end 2*b* of the fibre optic cable 2 is adjusted (arrow m).

In another embodiment (not shown), the sealing head assembly 1 of FIG. 3 can be provided with a second resilient member 28 provided between the second window 20*b* and the mirror housing 27, or a second resilient member provided between the sensing volume 24 and the second window 20*b*.

Figure 4:
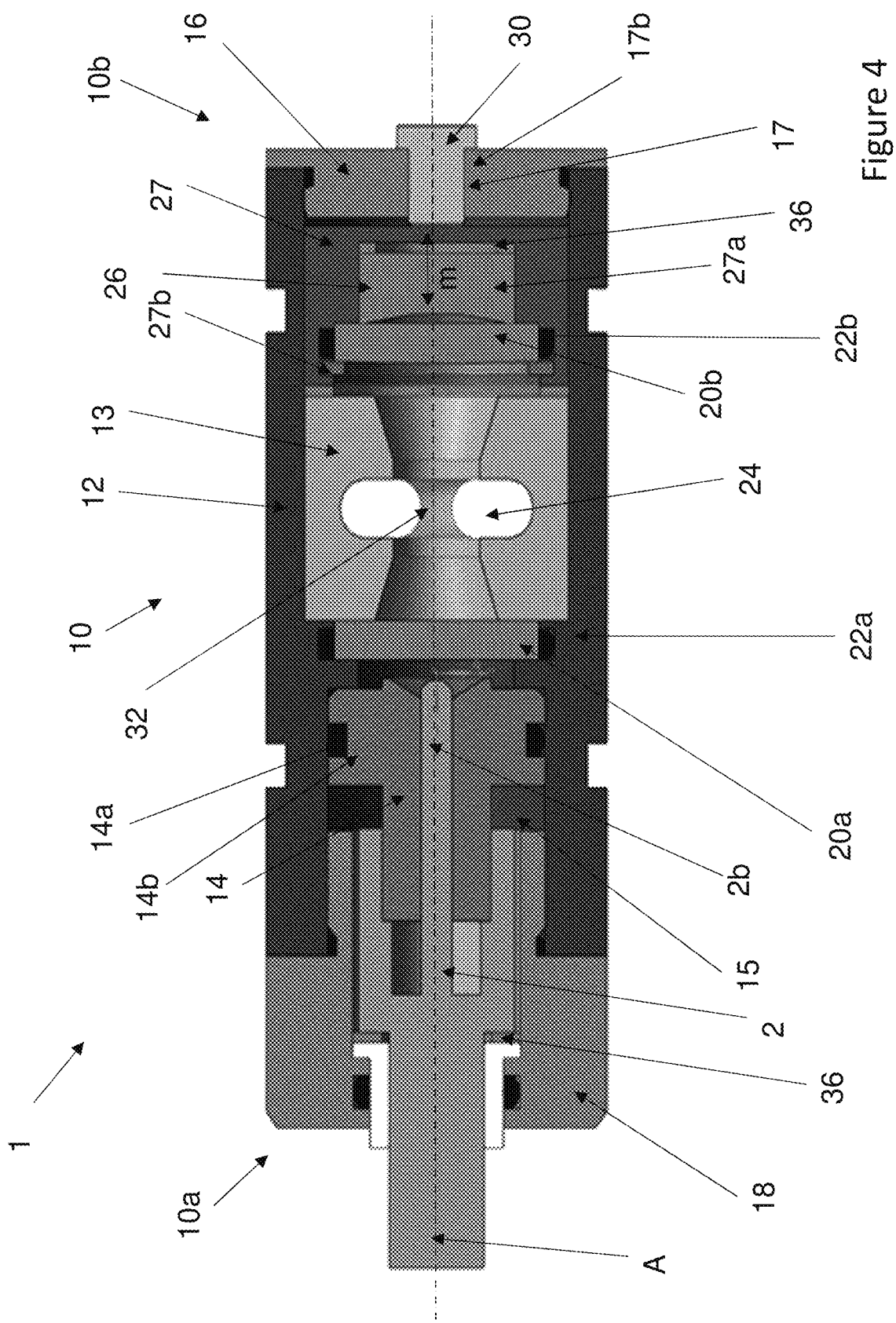
FIG. 4 shows a schematic cross-sectional view of a sensor head assembly according to another example of the present disclosure.

FIG. 4 shows a further embodiment of a sensor head assembly according to a further example, and again same reference signs are used for same or corresponding components.

In FIG. 4, the cable holder 14 has the modified profile described for FIG. 4, however it will be appreciated that a profile such as shown in FIG. 1 can also be provided. The grip 18 of FIG. 4 has a modified geometry to support the fibre optic cable 2. The main housing 12 includes an inner body 13 within which the sensing volume 24 is provided.

The first window 20a is provided with a sealing member 22a provided around circumference of the window 20a, thereby providing axial sealing of the sensing volume 24.

The mirror housing 27 of FIG. 4 supports and holds the second window 20b, as well as the concave mirror 26. One or more fixing element 27b can be provided to secure the second window within the cavity 27a. The second sealing member 22b is provided between the circumference of the second window 20b and an inner wall of the cavity 27a. The proximal end of the mirror housing 27 is coupled to the threaded member 30, such that movement of the threaded member 30 adjusts the axial position of the concave mirror 26 and the second window 20b (shown with arrow m).

The sensor head assembly 1 of FIG. 4 includes anti-backlash components 36 provided at the distal and proximal ends of the sensor head assembly 1. The anti-backlash components 36 could be any suitable resilient member, capable of absorbing shock forces, such as but not limited to wave washers or wave springs. It will be appreciated that anti-backlash components, similar to those depicted in FIG. 4, may be incorporated into any example of the current disclosure.

Figure 5:
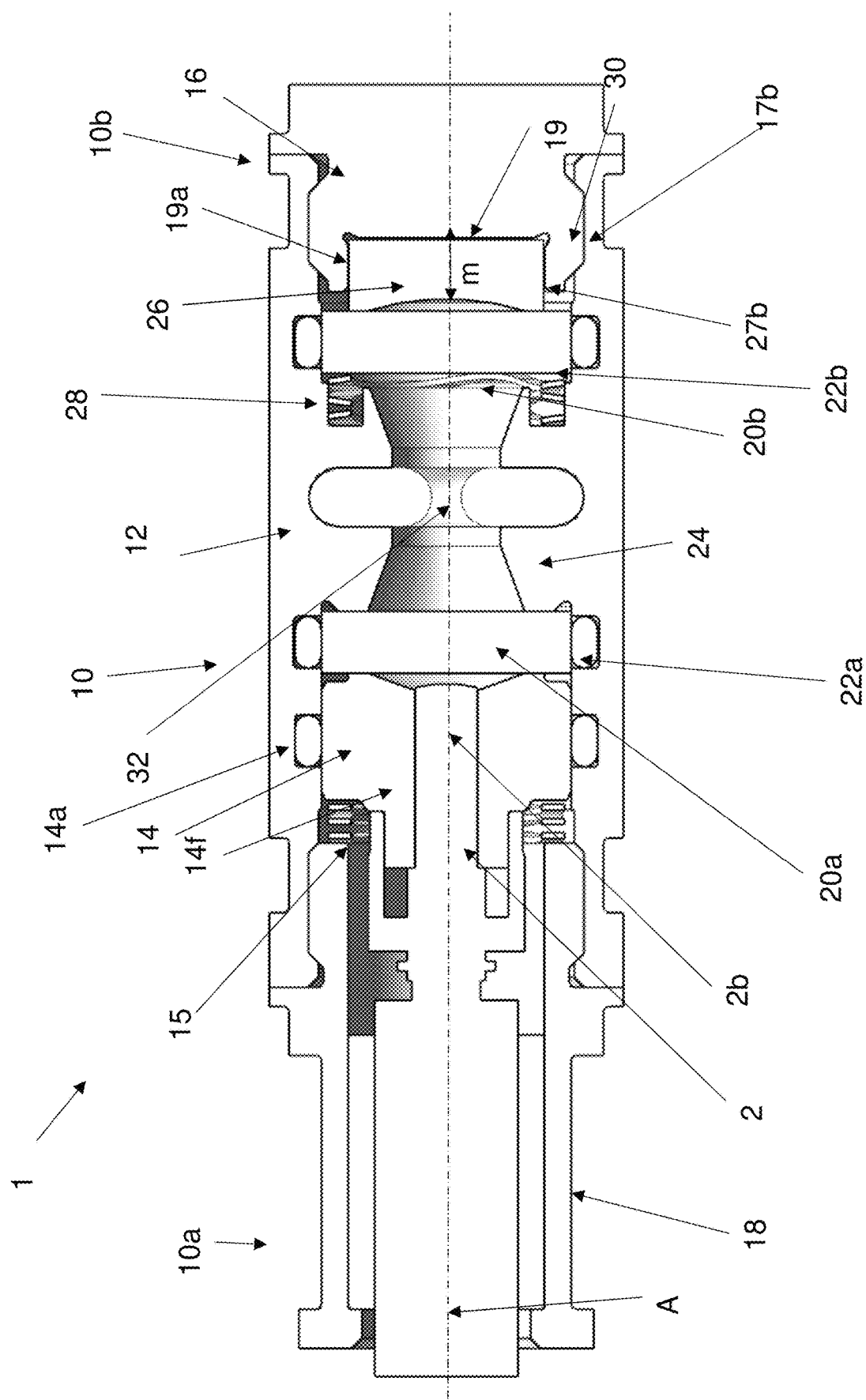
FIG. 5 shows a cross-sectional schematic view of a sensor head assembly according to a further example of the present disclosure.

FIG. 5 shows a further example a sensor head assembly 1. In this example, the resilient member 15 provided between the grip 18 and the cable holder 14 is represented as a wave washer.

In FIG. 5, the first and second windows 20a, 20b are provided with sealing members 22a, 22b provided around the window circumference.

In another example (not shown) the first window 20a is provided with a sealing member 22a located on a proximal surface (i.e. remote from the sensing volume 24), thereby providing an axial sealing. A corresponding sealing member 22b is provided on a distal surface of the second window 20b. In this example the sealing members 22a 22b are O-rings, or any other suitable sealing member.

A sealing member 14a is provided around an outer surface of the cable holder 14.

The cap 16 includes an inner cavity 19. The distal end of the concave mirror 26 is located within the cavity 19, and the concave mirror 26 is secured inside the cavity 19 by one or more fixing elements 27b. The second resilient member 28 is provided on a proximal side of the second window 20b. The outer surface of the cap 16 is provided with a screw threaded section 30. The inner surface of the housing wall includes a corresponding screw thread 17b. The axial position of the cap 16 within the body 10 can therefore be adjusted by screwing the cap 16 towards and away from the second window 20b. Movement of the cap 16 within the body 10 adjusts the position of the concave mirror 26 within the sensor head assembly 1.

Figure 6:
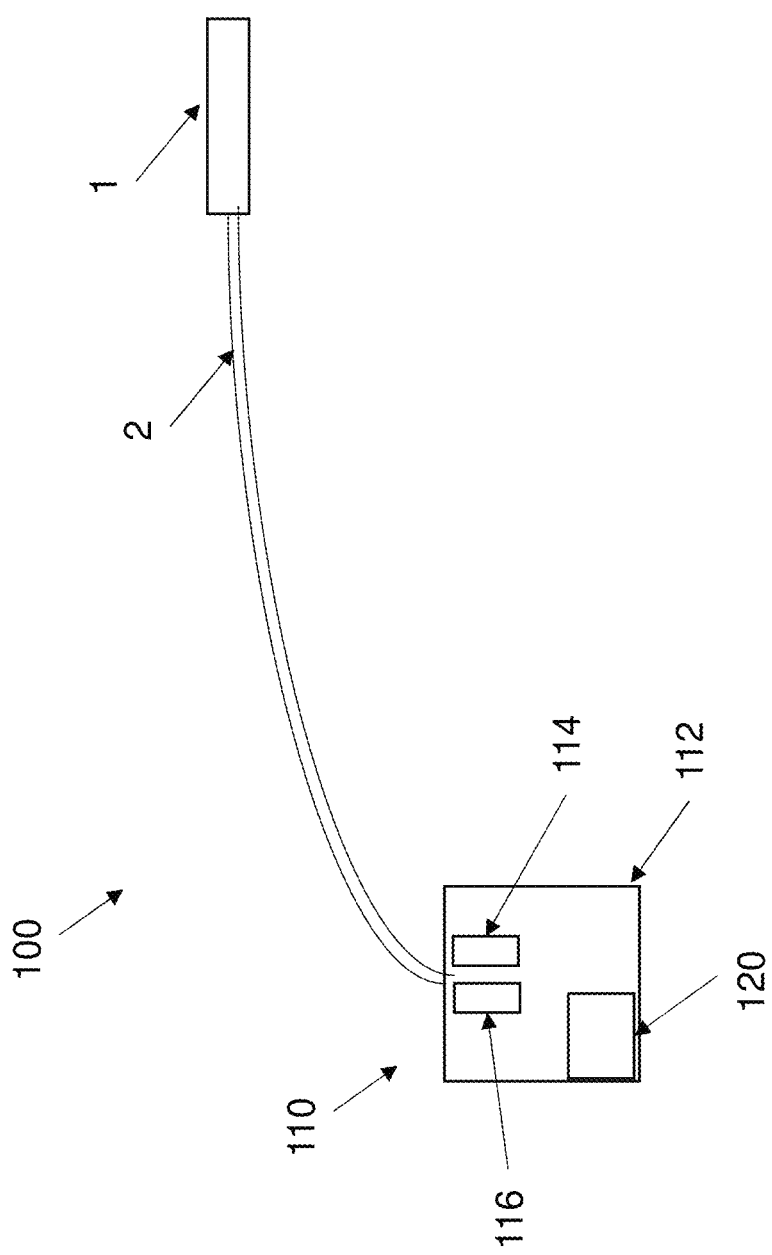
FIG. 6 is a schematic illustration of a measurement system according to the present disclosure.

FIG. 6 shows a schematic representation of a measurement system 100 for powderised agent comprising a control box 110, a fibre optic cable 2 and a sensor head 1. It will be appreciated that any of the sensor head assemblies 1 described above may be used.

The control box 110 includes a housing 112, a light source 114, one or more photo diodes 116 and a controller 120. It will be appreciated that the control box includes other components, but for simplicity only these components are shown.

In use, the fibre optic cable 2 is coupled at a first end 2a to the control box 110. A second end 2b (sensor end) of the fibre optic cable 2 is secured to the sensor head assembly 1. Light is transmitted from the light source 114, which may comprise for example one or more LEDs, through the fibre optic cable 2 into the sensor head assembly 1. During set-up and calibration of the sensor head assembly, the axial position of the mirror 26 within the elongate body 10 of the sensor head assembly 1 can be adjusted in order to adjust the position of the concave mirror 26 with respect to the end 2b of the fibre optic cable 2 which results in adjustment of the focal point of the sensor assembly 1.

In use, light is transmitted from the LED light source 114 in the control box 110, through the fibre optic cable 2 into the sensor head assembly 1. The light exits the end 2b of the fibre optic cable 2, passes through the first window 20a, the sensing volume 24 and the second window 20b. When it reaches the concave mirror 26, the light is reflected back through the second window 20b, the sensing volume 24 and the first window 20a and then back into the fibre optic cable 2 and is directed into the one or more photo diodes 116.

The axial position of the concave mirror 26 within the elongate body 10 of the sensor head assembly 1 can be adjusted in response to the data outputted from the control box 110 to optimise the performance of the sensor head assembly 1.

The axial position of the concave mirror 26 within the elongate body 10 of the sensor head assembly 1 can be adjusted to achieve an optimum distance between the end 2b of the fibre optic cable 2 and the concave mirror 2.

In the examples above, two windows are provided at each side of the sensing volume. However, it will be appreciated that sensor head assemblies may be provided with additional windows, provided at the distal and/or proximal sides of the sensing volume.

Whilst in the examples above, the sensor head assembly includes windows which are clear, it will be appreciated that the term "windows" also includes lenses. One or more lenses configured to diverge or converge light as required by the geometry and/or operating requirements of the sensor head assembly. Therefore, in other examples (not shown), sensor head assemblies may include one or more lenses. The one or more lenses may be provided instead of or in addition to clear windows. For example, clear windows may be provided with sealing members to prevent ingression of particles into clean areas of the sensor head assembly, and one or more lenses may also be provided at a distal or proximal side of one the clear window(s).

It will be appreciated by those skilled in the art that the disclosure has been illustrated by describing one or more specific aspects thereof, but is not limited to these aspects; many variations and modifications are possible, within the scope of the accompanying claims.

The invention claimed is:

1. A sensor head assembly for a measurement system for powderised agent comprising:
   an elongate body having a distal end and a proximal end configured to receive a fibre optic cable;
   a sensing chamber provided within the elongate body;
   a first window provided at a proximal side of the sensing chamber and a second window provided at a distal end of the sensing chamber;
   a concave mirror mounted within the elongate body at a distal side of the second window, wherein the concave mirror is mounted such that its axial position within the elongate body is adjustable; and
   a biasing member that is a coil spring or a wave spring; wherein the biasing member is provided between the sensing chamber and the second window such that it biases the second window and the concave mirror away from the sensing chamber.

2. The sensor head assembly according to claim 1, further comprising a first engagement member moveably coupled to a corresponding engagement member provided within the elongate body.

3. The sensor head assembly according to claim 2, wherein the first engagement member is configured such that movement of the first engagement member with respect to the corresponding engagement member causes the concave mirror to move within the elongate body.

4. The sensor head assembly according to claim 3, wherein the first engagement member is a threaded component and the corresponding engagement member is a corresponding screw thread.

5. The sensor head assembly according to claim 4, wherein the concave mirror is coupled to the threaded component.

6. The sensor head assembly according to claim 1, further comprising;

a cap at the distal end;

wherein a corresponding engagement member is provided in a through hole in the cap.

7. The sensor head assembly according to claim 1, wherein the concave mirror is at least partially radially supported by a proximal end of a cap provided within the distal end of the elongate body.

8. The sensor head assembly according to claim 1, the first window and/or the second window are provided with a radial sealing member.

9. The sensor head assembly according to claim 1, comprising a mirror housing provided within the elongate body, wherein the concave mirror is coupled to the mirror housing.

10. The sensor head assembly according to claim 1, comprising a cap moveably mounted within the distal end of the elongate body, wherein the concave mirror is coupled to the cap.

11. The sensor head assembly according to claim 10, wherein the concave mirror is directly coupled to the cap, such that the concave mirror moves with the cap.

12. A method of using a screw head assembly according to claim 1, the method comprising:

mounting the sensor head assembly to a fibre optic cable by inserting a second end of the fibre optic cable into the fibre optic cable holder; and adjusting the position of the concave mirror within the elongate body.

13. A measurement system for powderised agent comprising a control box;

a fibre optic cable coupled at a first end to the control box; and a sensor head according to claim 1 mounted to a second end of the fibre optic cable.

* * * * *